(No Model.) 2 Sheets—Sheet 1.

J. E. REED.
AGRICULTURAL MACHINE.

No. 463,966. Patented Nov. 24, 1891.

Witnesses
M. C. Galer
Alfred T. Townsend

Inventor
John E. Reed
by Hazard & Townsend
his Attys.

(No Model.) 2 Sheets—Sheet 2.
J. E. REED.
AGRICULTURAL MACHINE.
No. 463,966. Patented Nov. 24, 1891.
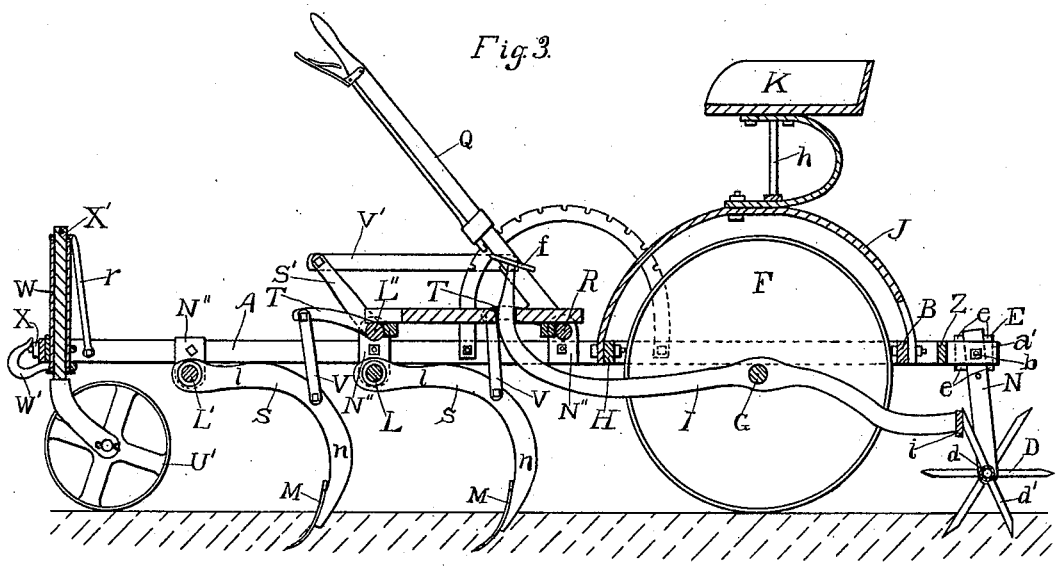
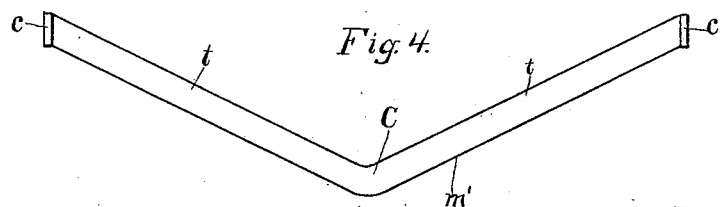
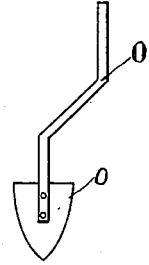 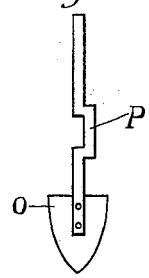 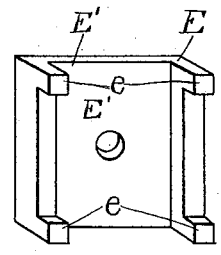
Witnesses.
M. C. Galer
Alfred I. Townsend
Inventor.
John E. Reed
by Hazard & Townsend
his Attys.

UNITED STATES PATENT OFFICE.

JOHN E. REED, OF LOS ANGELES, CALIFORNIA.

AGRICULTURAL MACHINE.

SPECIFICATION forming part of Letters Patent No. 463,966, dated November 24, 1891.

Application filed January 9, 1891. Serial No. 377,206. (No model.)

*To all whom it may concern:*

Be it known that I, JOHN E. REED, a citizen of the United States, residing at Los Angeles, in the county of Los Angeles and State of California, have invented a new and useful Agricultural Machine, of which the following is a specification.

My invention relates to that class of agricultural machines in which the cultivator-teeth are mounted on a frame sustained by clod-crushing rollers.

The object of my invention is to increase the strength and diminish the weight of the machine, and also to increase the convenience of its operation and the variety of work which it will perform; also, to secure greater uniformity in the depth of cultivation. It comprises the machine proper and the different attachments therefor which are designed to be used successively in preparing the ground and fitting it for growing crops or for irrigation.

The accompanying drawings illustrate my invention.

Figure 1:
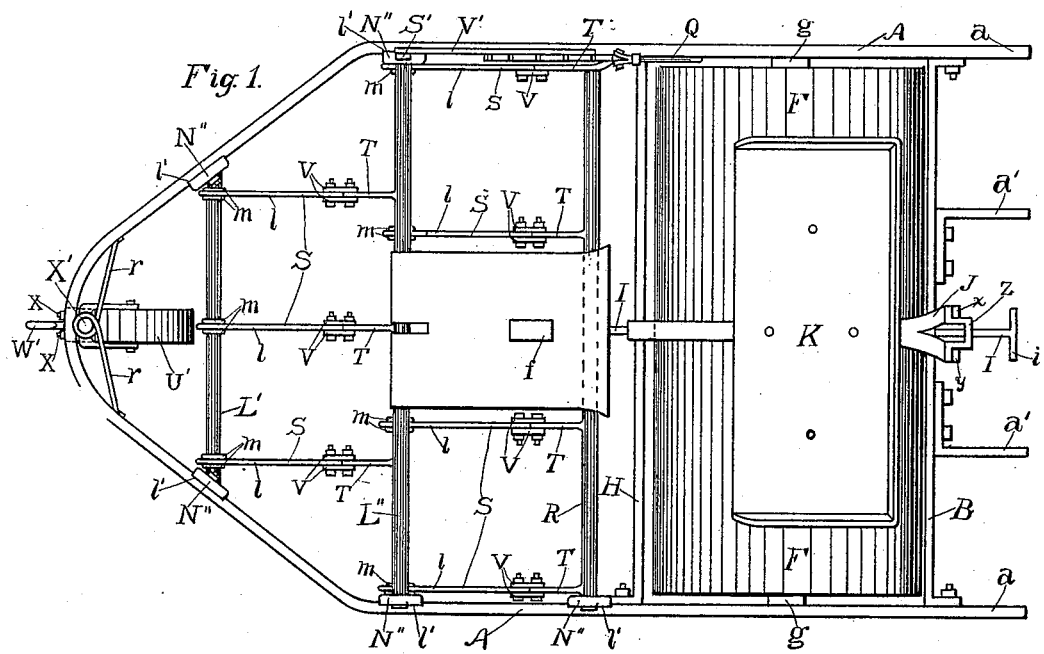
Figure 2:
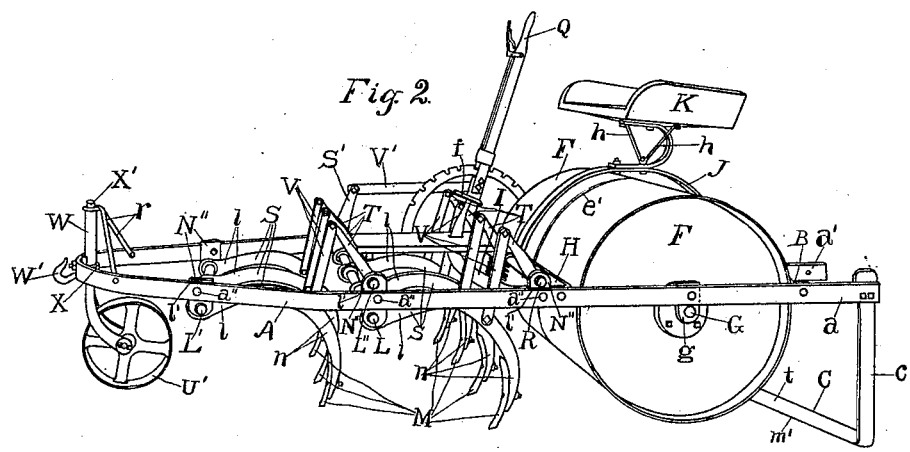

Figure 1 is a plan view of the main part of the machine with its attachments detached. Fig. 2 is a perspective side elevation of the machine in operation as a weed-cutter. Fig. 3 is a longitudinal mid-section showing the machine adjusted to stir the ground. Fig. 4 is a plan view of the weed-cutter. Fig. 5 is a rear view of one of the plows designed to be attached to the attachment-arms $a$ $a$. Fig. 6 is a rear view of the center plow. Fig. 7 is a perspective view of the clip used to secure the rake-posts to the attachment-arms.

One of the valuable features of my invention is the peculiar outer frame within which all the parts are secured. This frame enables me to secure greater strength with smaller bulk and weight of material than has heretofore been secured with machines of this class.

My invention also comprises the means employed for securing these parts to the frame; also, the peculiar combination of the several parts by which I secure superior efficiency of operation.

It is often desirable in machines of this class that there be no projecting parts which are liable to come into contact with the trees or plants to injure the bark or break the plants when the machine is used in cultivating orchards or any growing crops.

My improved frame is so constructed that it forms a continuous smooth guard, which is not liable to injure the bark of the trees or break or tear the plants.

It consists of the continuous outer U-shaped member A, formed of a single bar of iron, steel, or other suitable material, and cross-ties or braces, such as the rear cross-bar B of like suitable material extending across between and secured to the two limbs of the U near the ends thereof, leaving a portion of such limbs projecting behind the cross-bar to form the rearwardly-projecting attachment-arms $a$, and the front cross bar or tie H, extending across the U in front of the roller. The rear cross-bar is provided with two rearwardly-projecting intermediate attachment-arms $a'$ $a'$.

My invention comprises an agricultural machine provided with the above-described frame, in combination with clod-crushing and frame-supporting rollers journaled to the frame and suitable attachments, such as herein set forth.

In practice the weed-cutter C is secured by its standard-arms $c$ $c$ to the lateral attachment-arms $a$ $a$ when it is desired to cut the weeds, and when that has been accomplished, the weed-cutter is removed and the rake D is attached.

The rake-shaft $d$ is journaled in the journal-posts N, which are clamped in the clips E, arranged to fit upon the intermediate attachment-arms $a'$ and provided with means—such as the bolt $b$—for securing them to such arms. Such bolt is passed through the clip, post, and arm, and the journal-posts N, fitting closely in the deep channel E', and the lugs $e$, projecting from each side of the channel and fitting closely against the top and bottom of the attachment-arms, and, in combination with the bolt $b$, holds such posts rigidly in position. Ordinarily the shaft is made so rigid that only two of the clips E are required, such clips being secured, respectively, to the intermediate attachment-arms $a$ $a'$; but if it is desired, four posts and clips may be used, one for each attachment-arm. The rake is formed of a cylindrical shaft $d$, and the teeth $d'$ are inserted through it, projecting equidistant on each side thereof.

A series of clod-crushing rollers F are journaled immediately in front of the rear cross-bar B on the roller-shaft G, which is journaled at its ends to the side limbs of the outer U member of the frame. The frame is provided immediately in front of the roller with the transverse tie or cross bar H to give superior strength at this point to prevent any springing of the outer member, which might cause the journals $g$ and the roller-shaft to bind. The rollers F are arranged slightly apart to leave a space $e'$ at the mid-line of the machine, and the rake-operating bar or lever I is journaled upon the roller-shaft between the two rollers F F and projects to the front and rear of the rollers and is provided at its front end with the foot-plate $f$ and at its rear end with the cross-piece $i$, which is arranged to move across the upper portion of the path of the teeth of the revolving rake D to be operated to hold the teeth from moving and to release the teeth to allow the rake to revolve to clean itself. The seat-bow J is fixed to the tie H and cross-bar B and extends over the rollers midway between the side members of the U to sustain the seat K, which may be secured thereto immediately if a low seat is desired, or by brackets $h\,h$ if a high seat is desired. In case it is not desired to use the rollers, they may be removed and wheels substituted in their stead. Cultivator-teeth-sustaining shafts L L' are secured to the U and are provided with adjustable collars $m$, which slide upon the shafts and are placed one upon each side of the cultivator-tooth shanks, which are provided with a hole at the upper end thereof, through which the shaft is passed, and when in place, the collars are secured in position by means of set-screws.

The weed-cutter comprises a single V-shaped blade bent up at right angles at its ends to form attaching standards, and provided on the outside of the horizontal portion $t$ of the V with the cutting-edge $m'$. The rollers, attachment, standards, and cutter are so proportioned and arranged that when the upper ends of the standards are fixed to the attachment-arms by suitable means, such as the two bolts at each end shown in Fig. 2, the cutting-edge will extend beneath the roller, so that when the machine is advanced the roller will press the weeds down and the cutter will sever the roots while the weeds are thus held down.

In case it is desired to make furrows for irrigating or planting seeds or for any other purpose, the plows O are attached to the attachment-arms by the same clips that are used to attach the rake-posts to the attachment-arms, and two plows on each side are attached to the lateral attachment-arms $a$ of the frame, and the posts O' thereof are bent in opposite directions, so that when secured in position the outer plow will extend laterally about six inches beyond the outside of the frame A, and the inner one about the same distance inside. One plow is also attached to the center of the machine by loosening the bolts $x\,y$, which secure the clip Z and the arm J to the cross-bar B, and inserting therethrough the post P of the plow, which is bent to fit upon the seat-arm J, and when in place the bolts are tightened, thus bringing the post firmly against the arm J and so holding the plow in position. The post P of the plow is so bent as to prevent contact with the rake-bar I. The width between the furrows can be changed at will by removing the plows that are not desired.

A valuable feature of my invention consists in the combination and arrangement of parts for controlling the cultivator-teeth.

The cultivator-teeth are so attached to their shafts L L' as to allow them to swing up and down. This may be done by using cylindrical shafts and journaling the shank of the tooth thereupon or the shafts may be journaled to the frame. The cultivator-shanks S are bent at their free ends to form the two members $l\,n$. The long arm or member $l$ is pivoted to the shaft and the short post or member $n$ is provided with the cultivator-tooth M.

The main rock-shaft R is provided with the rigid radial arms T, which are connected with the arms $l$ by connecting-rods V near the bend in the shanks S. The combined length of the arm $l$ and radial arm T is approximately equal to but slightly greater than the space between the main rock-shaft R and the cultivator-shaft L, and the posts $n$ and connecting-rod V are of such length with relation to the height of the cultivator-shaft L and radial arm T that when the lever Q is thrown forward to force the tooth into the ground the post $n$ and connecting-rod V will move axially in the direction of the cultivator-tooth, thus applying the force more directly and effectively than heretofore and giving greater rigidity to the teeth, so that they will cultivate to a uniform depth. The cultivator-controlling lever Q is attached firmly to the main rock-shaft R, and the pitman V', which actuates rock-shaft L'', is pivoted to the lever Q at a point the same distance from the pivotal point of the lever as the pivotal point of the radial arms T, so that the rock-shafts will operate uniformly with each other. The pitman V' extends forward to the radial arm S', which extends from the rock-shaft L''.

The front end of the frame is supported by a caster-wheel U', journaled to the front end or point of the frame A by means of a piece of gas-pipe bearing W, which is firmly fastened to the frame by means of the bracket, which is recessed upon one side to fit the gas-pipe and upon the other side to fit the inner side of the frame at the point thereof, and is secured in place by means of the clip X. The gas-pipe bearing W projects below the bottom of the frame A and passes through the eye of the draft-hook W', which is secured from sliding down into the way of the caster-wheel by battering the end of the gas-pipe. The journal-shaft X' of the caster-wheel U' is inserted from below through the gas-pipe and secured by a key or other suitable means. The gas-pipe bearing W is held rigidly erect by means of the two braces r, which are secured to the frame.

The cultivator-teeth supporting-shafts L L' and the rock-shafts R and L'' are journaled to the frame by means of clips N'', which are provided with a gain l', which fit snugly upon the inner side of the frame A, and the clip is held in place by a single bolt a'', and the rock-shaft L'' and the cultivator-tooth shaft L' are both journaled to the same clip L'' above the frame A and L' below.

Now, having described my invention, what I claim as new, and desire to secure by Letters Patent, is—

1. The combination of the weed-cutter comprising a V-shaped blade bent up at right angles at its ends to form the standards, the frame provided with the attachment-arms, means for securing the standards to the arms, and the rollers, all so proportioned and arranged that when the standards are attached to the arms the point of the cutter will extend beneath the roller.

2. The combination of the continuous outer frame, the rollers journaled to the frame, the cultivator-shanks journaled to the cultivator-shafts, the rock-shafts provided with the radial arms and connected to the cultivator-shanks by pitmen in such a manner that the power applied to force the teeth into the ground will move the pitmen axially in the direction of the cultivator-teeth.

3. The combination of the continuous outer frame, the caster-wheel journaled to the front of the frame, the cultivator-shanks journaled to the shafts secured to the frame, the rock-shafts journaled to the frame, means operatively connecting such rock-shafts with the cultivator-shanks, means for operating the rock-shafts, the clod-crushing rollers journaled to the frame behind the cultivator-shanks, and the weed-cutter secured to the attachment-arms and so arranged and proportioned that when the weed-cutter is in operation the point thereof will be underneath the point where the rollers touch the ground.

JOHN E. REED.

Witnesses:
M. C. GALER,
ALFRED I. TOWNSEND.